United States Patent [19]
Delp et al.

[11] Patent Number: 5,752,078
[45] Date of Patent: May 12, 1998

[54] SYSTEM FOR MINIMIZING LATENCY DATA RECEPTION AND HANDLING DATA PACKET ERROR IF DETECTED WHILE TRANSFERRING DATA PACKET FROM ADAPTER MEMORY TO HOST MEMORY

[75] Inventors: Gary S. Delp; Philip L. Leichty, both of Rochester; Albert A. Slane, Oronoco, all of Minn.

[73] Assignee: International Business Machines Corporation, Armonk, N.Y.

[21] Appl. No.: 500,491

[22] Filed: Jul. 10, 1995

[51] Int. Cl.$^6$ .................................................. G06F 13/00
[52] U.S. Cl. .......................... 395/827; 395/825; 395/840; 395/872
[58] Field of Search ................................. 395/250, 800, 395/827, 825, 840, 872; 370/389, 463

[56] References Cited

U.S. PATENT DOCUMENTS

| | | | |
|---|---|---|---|
| 4,637,015 | 1/1987 | Bobey | 370/431 |
| 5,010,546 | 4/1991 | Kato | 370/469 |
| 5,210,749 | 5/1993 | Firoozmand | 370/463 |
| 5,293,487 | 3/1994 | Russo et al. | 395/200.2 |
| 5,367,643 | 11/1994 | Chang et al. | 395/309 |
| 5,398,245 | 3/1995 | Harriman, Jr. | 370/389 |
| 5,412,782 | 5/1995 | Hausman et al. | 395/250 |
| 5,606,665 | 2/1997 | Yang et al. | 395/200.2 |
| 5,623,606 | 4/1997 | Yokoyama et al. | 395/250 |
| 5,623,688 | 4/1997 | Ikeda et al. | 395/800 |

FOREIGN PATENT DOCUMENTS

| | | |
|---|---|---|
| 60-27256 | 2/1985 | Japan . |
| 2-137547 | 5/1990 | Japan . |
| WO 84/03192 | 8/1984 | WIPO . |
| WO 94/02900 | 2/1994 | WIPO . |

OTHER PUBLICATIONS

Comer, "Internetworking with TCP/IP vol. 1: Principles, Protocols, and Architecture", second edition, 1991, published by Prentice-Hall, Inc. pp. 92-93 and 181.

*Primary Examiner*—Frank J. Asta
*Assistant Examiner*—Le Hien Luu
*Attorney, Agent, or Firm*—Andrew J. Dillon

[57] ABSTRACT

A method and system within a data processing system are disclosed for receiving information from a communications network. The data processing system includes a communications adapter, having an adapter memory, and a host memory. The communications adapter is coupled to the communications network, which transmits information to the data processing system in packets including a packet header and packet data. According to the present invention, a portion of a packet of information is received from the communications network at the adapter memory within the communications adapter. The portion of the packet of information includes at least a packet header that specifies a length of the packet of information and a destination address within the host memory. In response to receipt of the portion of the packet of information, a transfer of the packet of information from the adapter memory to the host memory is prepared prior to receipt of a final portion of the packet of information at the adapter memory. The packet of information is then transferred from the adapter memory to addresses within the host memory beginning with the destination address. Since the transfer is prepared before packet receipt is complete, perceived latency is minimized.

8 Claims, 8 Drawing Sheets

5,752,078

SYSTEM FOR MINIMIZING LATENCY DATA RECEPTION AND HANDLING DATA PACKET ERROR IF DETECTED WHILE TRANSFERRING DATA PACKET FROM ADAPTER MEMORY TO HOST MEMORY

BACKGROUND OF THE INVENTION

1. Technical Field

The present invention relates in general to a method and apparatus for data communication and in particular to an improved method and apparatus for receiving data transmitted to a data processing system via a communications network. Still more particularly, the present invention relates to an improved method and apparatus for data reception within a data processing system employing a packet-based architecture which reduces latency by processing packet headers prior to the receipt of a complete data packet.

2. Description of the Related Art

A data processing system connected to a computer network typically includes an input/output (I/O) adapter to support data communication between the data processing system and the computer network. Typically, the I/O adapter employs either a host-based or a packet-based architecture. As utilized herein, the term host-based refers to an architecture in which a data packet is transferred by direct memory access (DMA) to the host memory within the data processing system as the data is received. Because host-based adapters transfer data to the host memory as it is received from the computer network, host-based adapters typically include only a small data buffer. In contrast, a packet-based architecture denotes an I/O adapter design which includes an adapter memory capable of storing one or more data packets. Typically, a packet-based adapter receives data packets from a computer network into the adapter memory and subsequently transfers complete data packets to the host memory by DMA.

With reference now to FIG. 7 there is illustrated a timeline depicting events within the reception of a data packet by a data processing system which utilizes a conventional packet-based I/O adapter. As illustrated, following the transfer of a packet of data from a computer network into adapter memory (bar 150), the I/O adapter notifies software executing within the host data processing system that a data packet has been received (bar 152). Then, as depicted by bar 154, the I/O adapter sets up a DMA transfer of the packet header to the host memory and thereafter performs the DMA transfer of the packet header, as illustrated by bar 156. After receiving a notification that the DMA transfer of the packet header is complete (bar 158), the I/O adapter examines the header of the data packet (bar 160) and sets up a DMA transfer of the data packet into user address space within the host memory (bar 162). The I/O adapter then performs a DMA transfer of the packet data to the user address space within the host memory (bar 164) and notifies the software within the host data processing system that the DMA transfer is complete, as illustrated by bar 166. Finally, bar 168 depicts the data processing system software informing the user that the data packet has arrived.

As is apparent from FIG. 7, one problem with conventional packet-based architecture is the latency that a user perceives between the time that a data packet is received by the I/O adapter and the time at which the user is notified that the data packet has arrived. Because of the sequential ordering of events within the data reception timeline, the user perceives the interval in which the data packet is transferred from the computer network to the I/O adapter and the time required to perform the DMA transfer of the packet from the adapter memory to the user address space within the host memory, as well as any additional processing within the protocol stack, such as checksumming or other error detection. Because of the user-perceived latency associated with packet-based architectures, many data processing systems employ a host-based adapter architecture.

Referring now to FIG. 8, there is depicted a timeline illustrating events within the reception of a data packet by a data processing system which utilizes a conventional host-based adapter. Bar 170 depicts the reception of a data packet by the host-based I/O adapter. As illustrated by bar 172, the host-based I/O adapter performs a concurrent DMA transfer of the data packet to system address space within the host memory of the data processing system. Next, the I/O adapter notifies the system software that a packet has been received from the computer network (bar 174). Then, as depicted by bars 176 and 178, the I/O adapter interrogates the packet header to determine a destination address within the user address space of the host memory and copies the data packet from the system address space to the destination address within the user address space of the host memory. Finally, as illustrated by bar 180, the I/O adapter notifies the user that a data packet has been received from the computer network.

Although a host-based adapter architecture decreases user-perceived latency since the DMA transfer of the data packet to system address space within the host memory chronologically overlaps the reception of the data packet, the user still perceives the latency associated with copying the data packet from the system address space to the user address space within the host memory. Furthermore, because the data packet is transferred without any processing to the host memory as it is being received from the computer network, the I/O adapter cannot perform inline DMA services on the data packet since a complete data packet is not available. Thus, DMA services such as checksumming or data encryption must be performed after the data is copied into the user address space, thereby further increasing user-perceived latency.

Consequently, it would be desirable to provide an improved method and system for data reception within a data processing system employing a packet-based architecture that reduce user-perceived latency by processing a packet header prior to the receipt of a complete data packet.

SUMMARY OF THE INVENTION

It is therefore one object of the present invention to provide a method and apparatus for data communication.

It is another object of the present invention to provide an improved method and apparatus for receiving data transmitted to a data processing system via a communications network.

It is yet another object of the present invention to provide an improved method and apparatus for data reception within a data processing system employing a packet-based architecture which reduces latency by processing a packet header prior to the receipt of a complete data packet.

The foregoing objects are achieved as is now described. A method and system within a data processing system are disclosed for receiving information from a communications network. The data processing system includes a communications adapter, having an adapter memory, and a host memory. The communications adapter is coupled to the communications network, which transmits information to the data processing system in packets including a packet header and packet data. According to the present invention, a portion of a packet of information is received from the communications network at the adapter memory within the communications adapter. The portion of the packet of information includes at least a packet header that specifies a length of the packet of information and a destination address within the host memory. In response to receipt of the portion of the packet of information, a transfer of the packet of information from the adapter memory to the host memory is prepared prior to receipt of a final portion of the packet of information at the adapter memory. The packet of information is then transferred from the adapter memory to addresses within the host memory beginning with the destination address. Since the transfer is prepared before packet receipt is complete, perceived latency is minimized.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
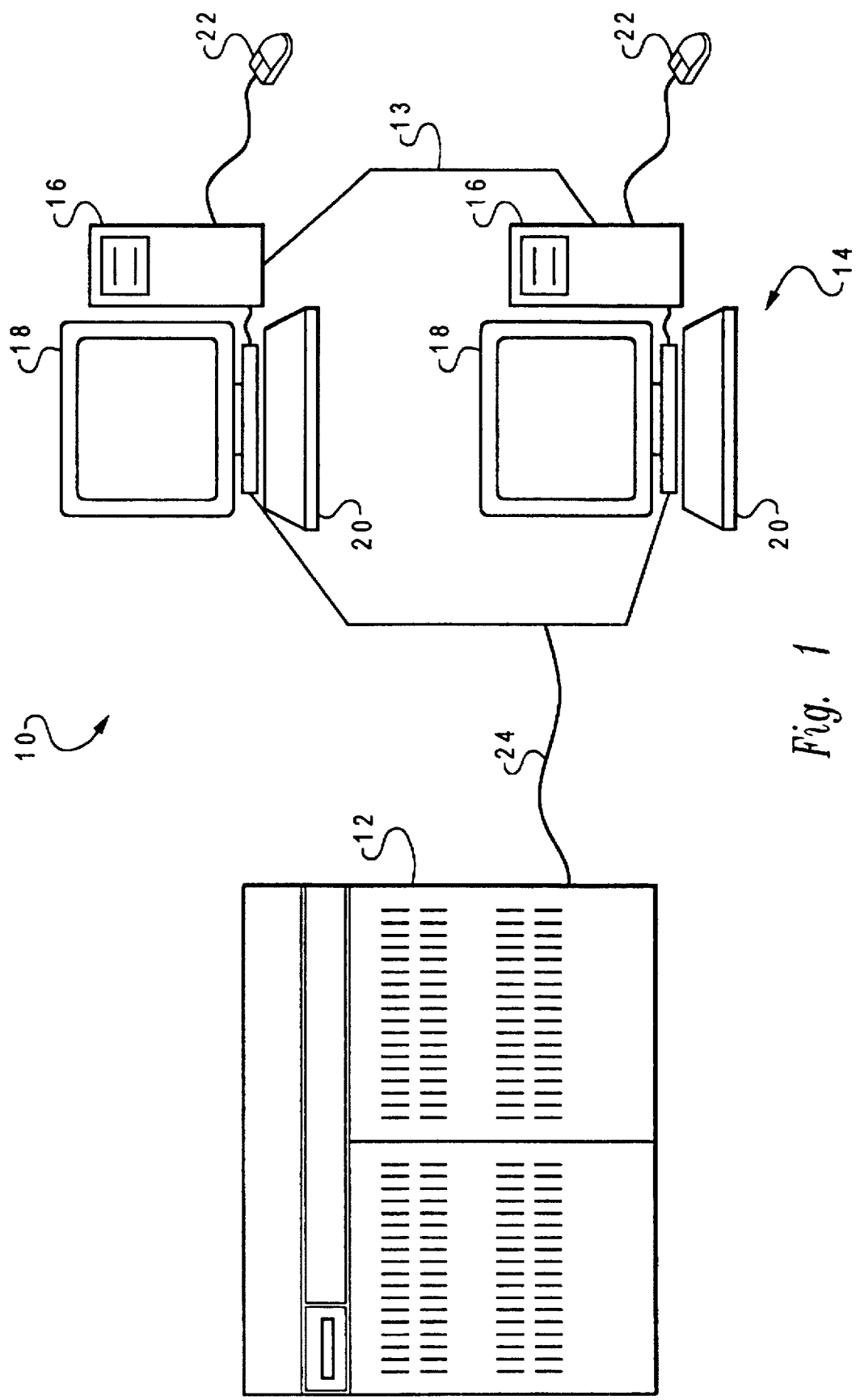
FIG. 1 illustrates a preferred embodiment of a communications network with which the method and system of the present invention can be advantageously utilized.

With reference now to the figures and in particular with reference to FIG. 1, there is illustrated a pictorial representation of a data processing system 10 which may be utilized to implement the method of the present invention. In the depicted embodiment, data processing system 10 includes server 12 and one or more clients 14. Each client 14 comprises a personal computer 16, display device 18, keyboard 20, and mouse 22. As is well-known to those skilled in the art, a user can input data to personal computer 16 utilizing keyboard 20, mouse 22, or other suitable input device. The user may then process data locally utilizing personal computer 16, or transmit the data from personal computer 16 to another client 14 across local area network (LAN) 13 utilizing conventional networking techniques. Similarly, a user can transmit tasks to server 12 across communications link 24. It is advantageous for a user to send tasks to server 12 for execution since server 12 can perform tasks in a relatively short period of time compared with one of clients 14.

As will be appreciated by those skilled in the art, communications link 24 and LAN 13 utilize an implementation-specific communications protocol, which in a preferred embodiment of the present invention comprises the asynchronous transfer mode (ATM) protocol. According to the ATM protocol, each packet of information transmitted via communications link 24 or LAN 13 is subdivided into a number of fixed-length cells. For example, in some implementations of the ATM protocol, each cell includes 48 bytes of cell data and an associated 5 byte cell header which describes the contents of the cell. Because each packet of information is subdivided into a number of discrete cells, multiple packets can be transmitted simultaneously across a network by interleaving cells from each of the multiple packets. Thus, although the network throughput afforded by the ATM protocol is high, a particular packet of information may arrive at a remote node within the network relatively slowly because of the interleaving of cells of other packets between the cells of the packet of interest. As described in greater detail below, the present invention minimizes the user-perceived latency between the arrival of the packet header and the availability of the packet data by processing the packet header while the packet data is being received.

Figure 2:
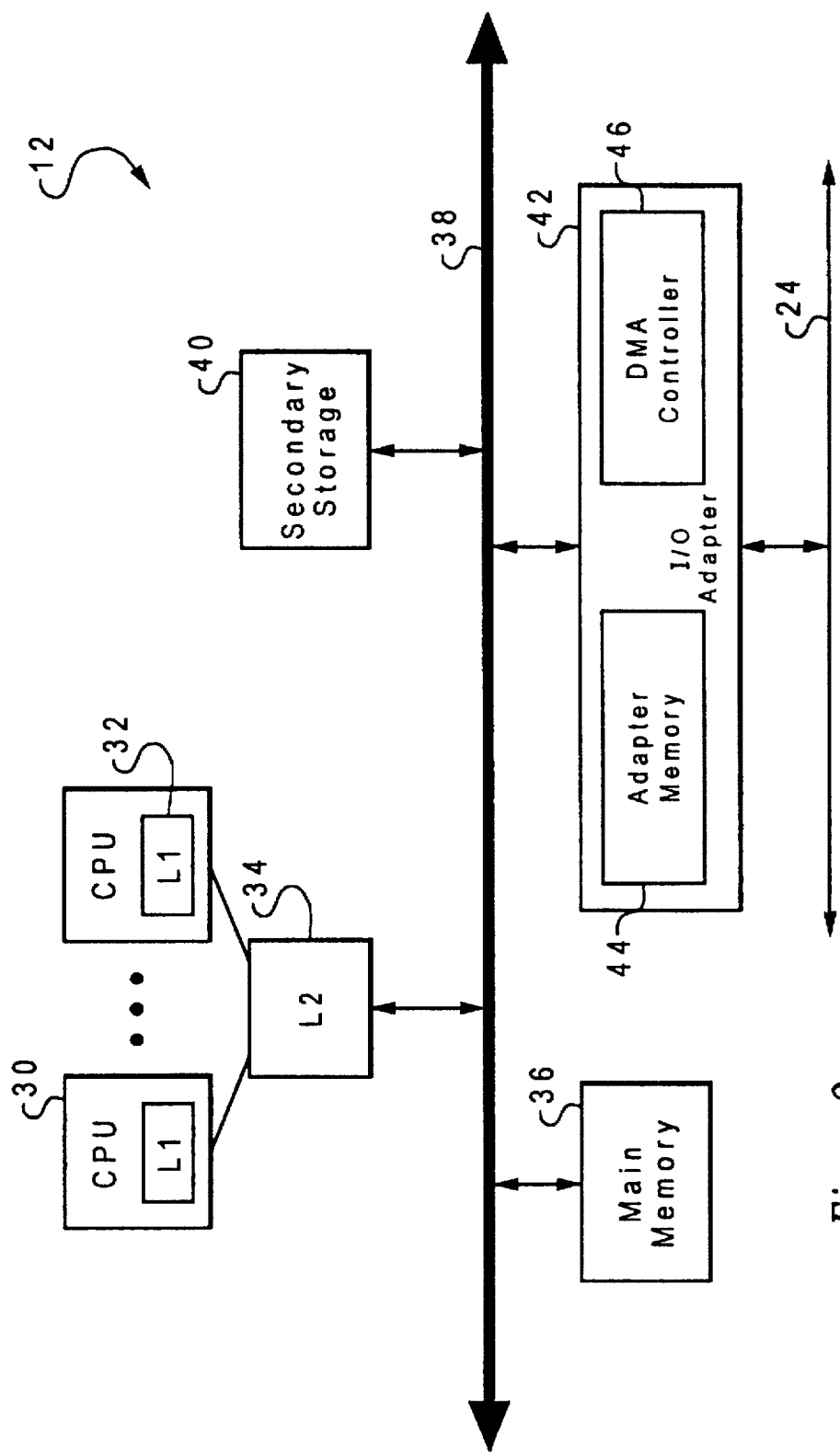
FIG. 2 depicts a block diagram of a preferred embodiment of the server illustrated in FIG. 1.

Referring now to FIG. 2, there is depicted a block diagram of server 12, which in a preferred embodiment of the present invention comprises a multiprocessor computer, such as the IBM RISC System/6000. As illustrated, server 12 includes one or more CPUs 30, which preferably run under a multithreaded operating system such as AIX (Advanced Interactive Executive), the IBM version of UNIX. According to the present invention, CPUs 30 also execute communications software which controls data communication between server 12 and communications link 24. Under AIX each of CPUs 30 concurrently executes a thread (i.e., a schedulable stream of instructions) of an operating system or user (communications software) process.

As depicted, each of CPUs 30 has an on-board level one (L1) cache 32 and an associated level two (L2) cache 34. As will be appreciated by those skilled in the art, L1 caches 32 and L2 cache 34 comprise relatively small, fast portions of memory that store frequently accessed data and instructions. When data or instructions requested by one of CPUs 30 is not resident within the processor's L1 cache 32 or L2 cache 34, CPU 30 accesses the requested data or instructions from main memory 36 or secondary storage 42 via system bus 38. Addresses within the address space of server 12 are mapped to the memory hierarchy comprising L1 caches 32, L2 cache 34, and main memory 36 by a memory manager (not illustrated). As is typical of many computer networks employing a server/client topology, the address space of server 12 is bifurcated between a global host (operating system) address space and a user address space. Each user process, for example, the communications software, is allocated a distinct portion of the user address space.

According to the present invention, server 12 also includes packet-based input/output (I/O) adapter 42. I/O adapter 42 is coupled to communications link 24 to facilitate data communication between server 12 and clients 14. As a packet-based adapter, I/O adapter 42 includes adapter memory 44, which is capable of storing one or more packets of information received by I/O adapter 42 from communications link 24. In addition, I/O adapter 42 includes an on-board DMA controller 46, which arbitrates between I/O adapter 42 and other "intelligent" devices (not illustrated) coupled to system bus 38 that perform DMA transfers. As will be appreciated by those skilled in the art, system unit 12 includes additional devices which are not necessary for an understanding of the present invention and are accordingly omitted from FIG. 2 for the sake of simplicity.

Figure 3:
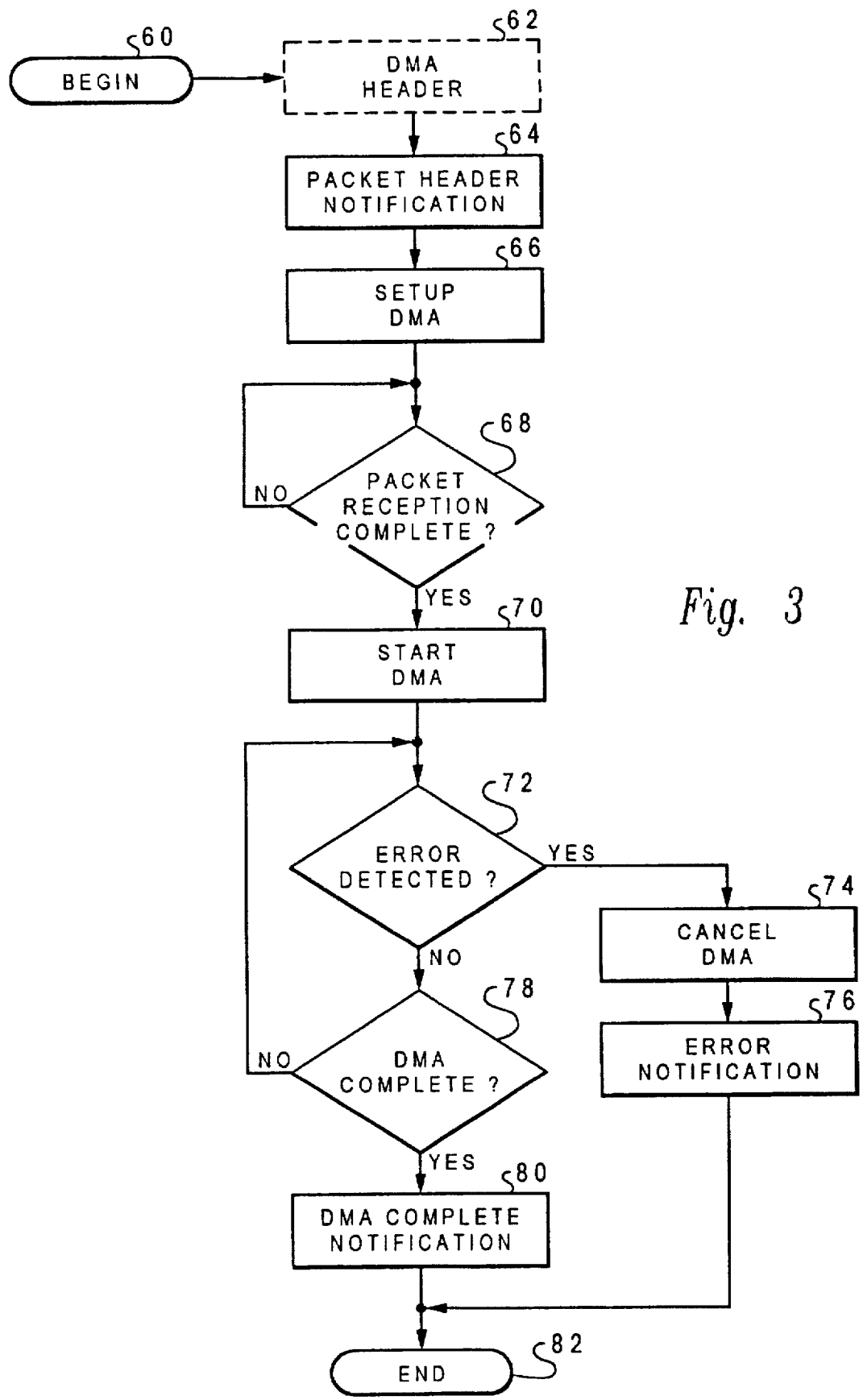
FIG. 3 is a flowchart illustrating a method for receiving a data packet from a communications network according to a first preferred embodiment of the present invention.
Figure 4:
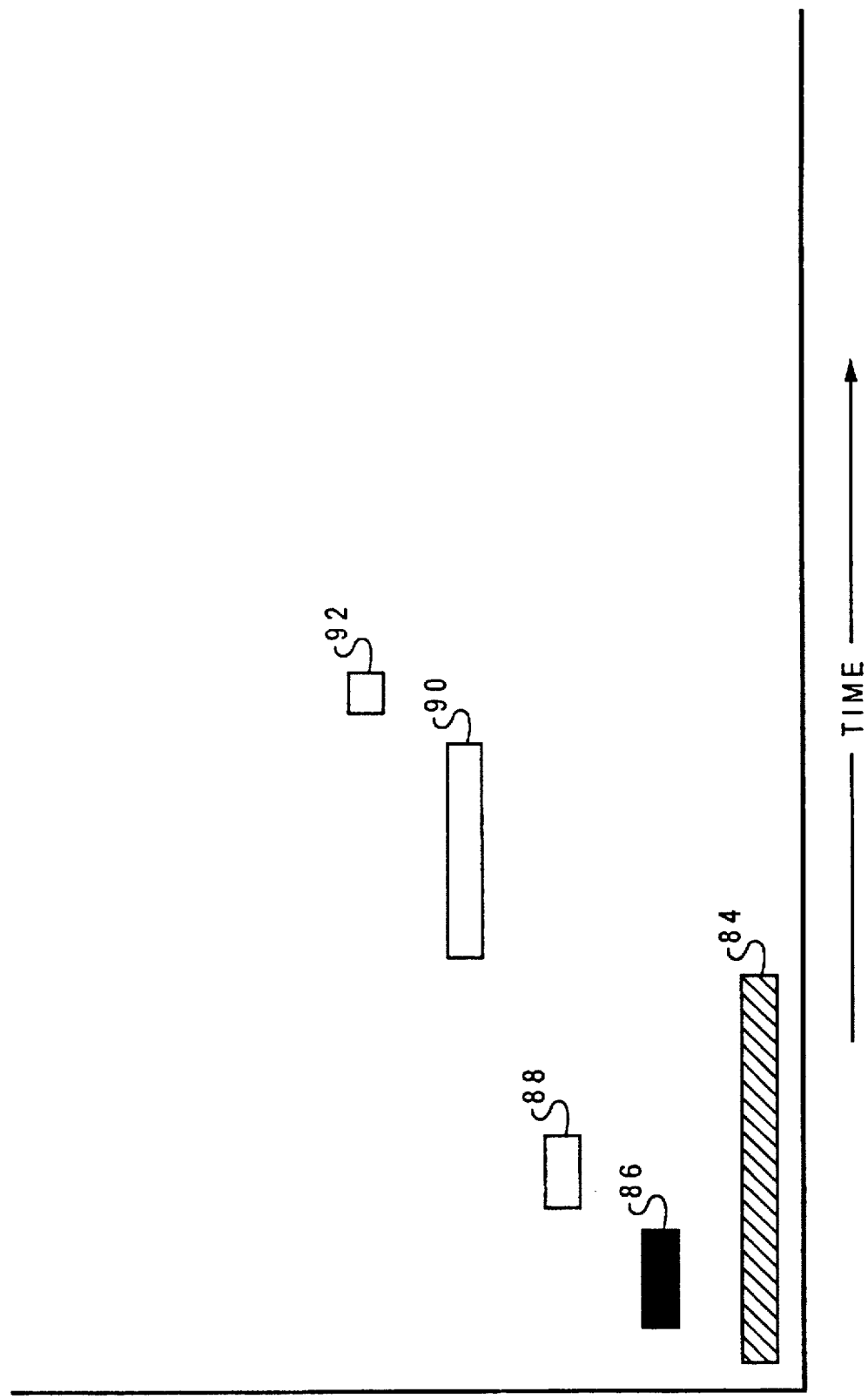
FIG. 4 depicts a timeline of events within the reception of a data packet according to the method illustrated in FIG. 3.

With reference now to FIGS. 3 and 4, there are illustrated a flowchart and timeline of the method of receiving information from a communications network according to a first preferred embodiment of the present invention. Referring first to FIG. 3, the process begins at block 60 when I/O adapter 42 begins receiving a packet of information from communications link 24. As the packet of information is received, I/O adapter 42 stores the packet of information within adapter memory 44. The reception of the packet of information is represented by bar 84 in FIG. 4. The process then proceeds from block 60 to block 62, which illustrates I/O adapter 42 performing a DMA transfer of the packet header to host address space within server 12 as soon as the packet header can be guaranteed to have been received. The threshold amount of data required to trigger the DMA transfer of the header is configurable on a per connection basis, thereby enabling the communications software to specify how much data must be received before the header can be guaranteed to have arrived. As indicated by dashed-line illustration, the packet header is transferred to host address space within server 12 only in cases where the communications software cannot directly access adapter memory 44. Otherwise, block 62 is not performed and the process proceeds to block 64.

Block 64 depicts I/O adapter 42 notifying the communications software that the packet header has been received. The packet header notification is illustrated by bar 86 in FIG. 4. Next, at block 66, the communications software interrogates the packet header to set up a DMA transfer of the packet from adapter memory 44 to user address space within server 12. The communications software is able to prepare for the DMA transfer prior to the arrival of the complete packet since the packet header includes information required to perform the DMA transfer, such as a protocol identifier, a destination address, and a length of the packet. Thus, as depicted by bar 88 of FIG. 4, the present invention reduces latency by processing the packet header prior to the completion of the reception of the packet. In contrast, conventional methods of receiving data from a communications network perform processing on the packet header only after the complete packet has been received as illustrated in FIG. 7.

The process then proceeds from block 66 to block 68, which depicts making a determination of whether reception of the packet is complete. If reception of the packet is not complete, the process waits at block 68 until reception of the packet is complete. Once packet reception is complete, the process proceeds to block 70, which depicts I/O adapter 42 enqueing or starting a DMA transfer of the packet from adapter memory 44 to the destination address within the user address space. The DMA transfer of the packet from adapter memory 44 to user address space is represented by bar 90 in FIG. 4. The DMA transfer is enqued, for example, when an earlier received packet has not yet been transferred to user address space. As the packet is transferred from adapter memory 44 to user address space, error detection is performed at block 72. For example, data within the packet can be checksummed to determine if the data was corrupted during transmission. If an error is detected at block 72, the process proceeds to block 74, which illustrates I/O adapter 44 cancelling the DMA transfer. The process then proceeds to block 76, which depicts I/O adapter 42 notifying the communications software that an error has been detected. Thereafter, the process terminates at block 82.

Returning to block 72, if an error is not detected during the DMA transfer, the process proceeds to block 78, which illustrates determining if the DMA transfer is complete. If not, the process returns to block 72. If, however, the DMA transfer is complete, the process proceeds to block 80, which depicts I/O adapter 42 notifying the communications software that the DMA transfer is complete (bar 92 of FIG. 4). The software can then notify the user that data has been received. Thereafter, the process terminates at block 82.

Figure 7:
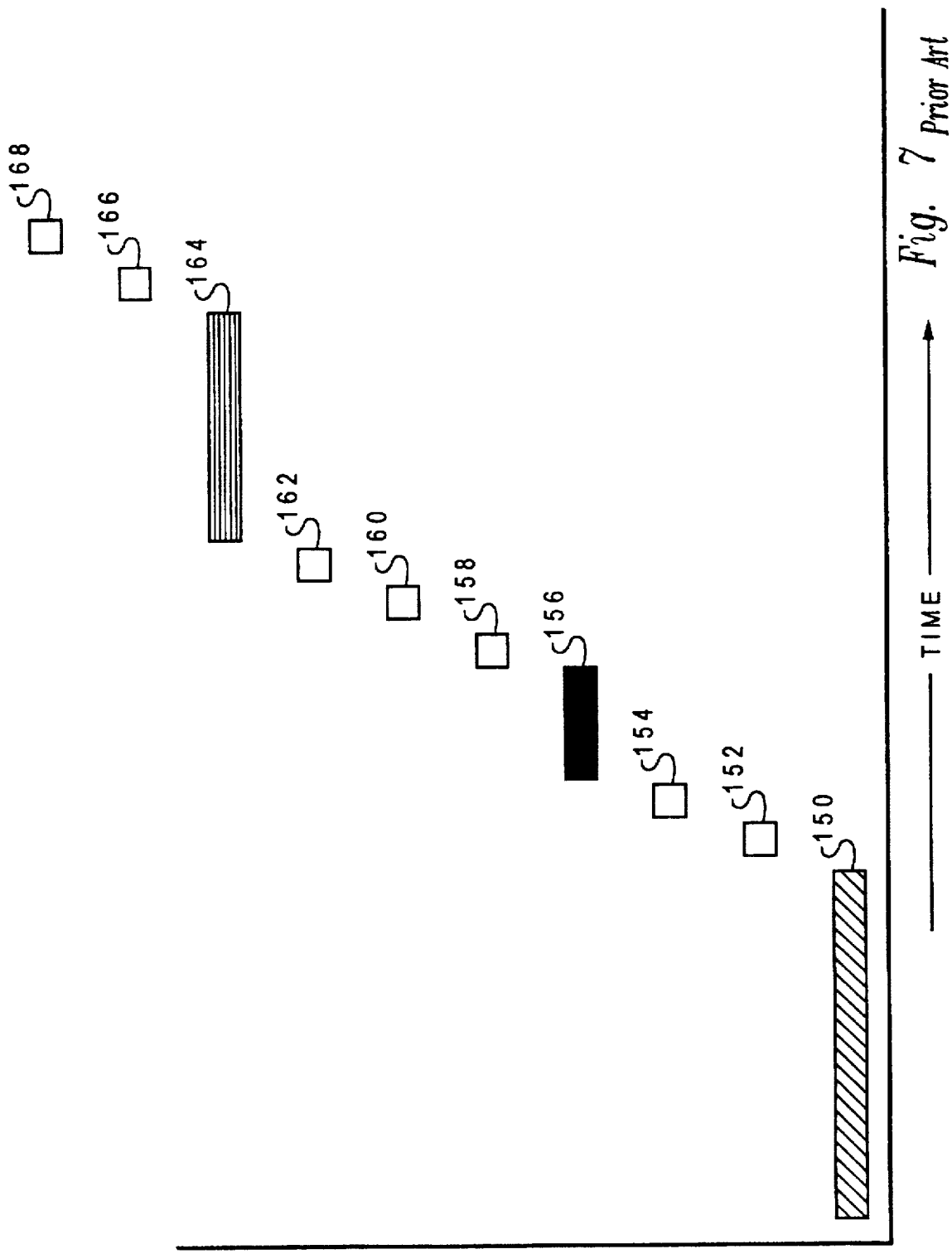
FIG. 7 is a timeline illustrating events within the reception of a data packet by a conventional packet-based I/O adapter within a data processing system.

By comparison to FIG. 7, it is apparent that the method for receiving information from a communications network illustrated in FIG. 3 results in a significant performance enhancement over the conventional method. By performing the DMA transfer of the packet header and by setting up the DMA transfer of the packet during reception of the packet, the present invention reduces packet latency. However, even greater performance enhancements can be achieved by employing the so-called immediate DMA utilized in the second preferred embodiment of the present invention depicted in FIG. 5.

Figure 5:
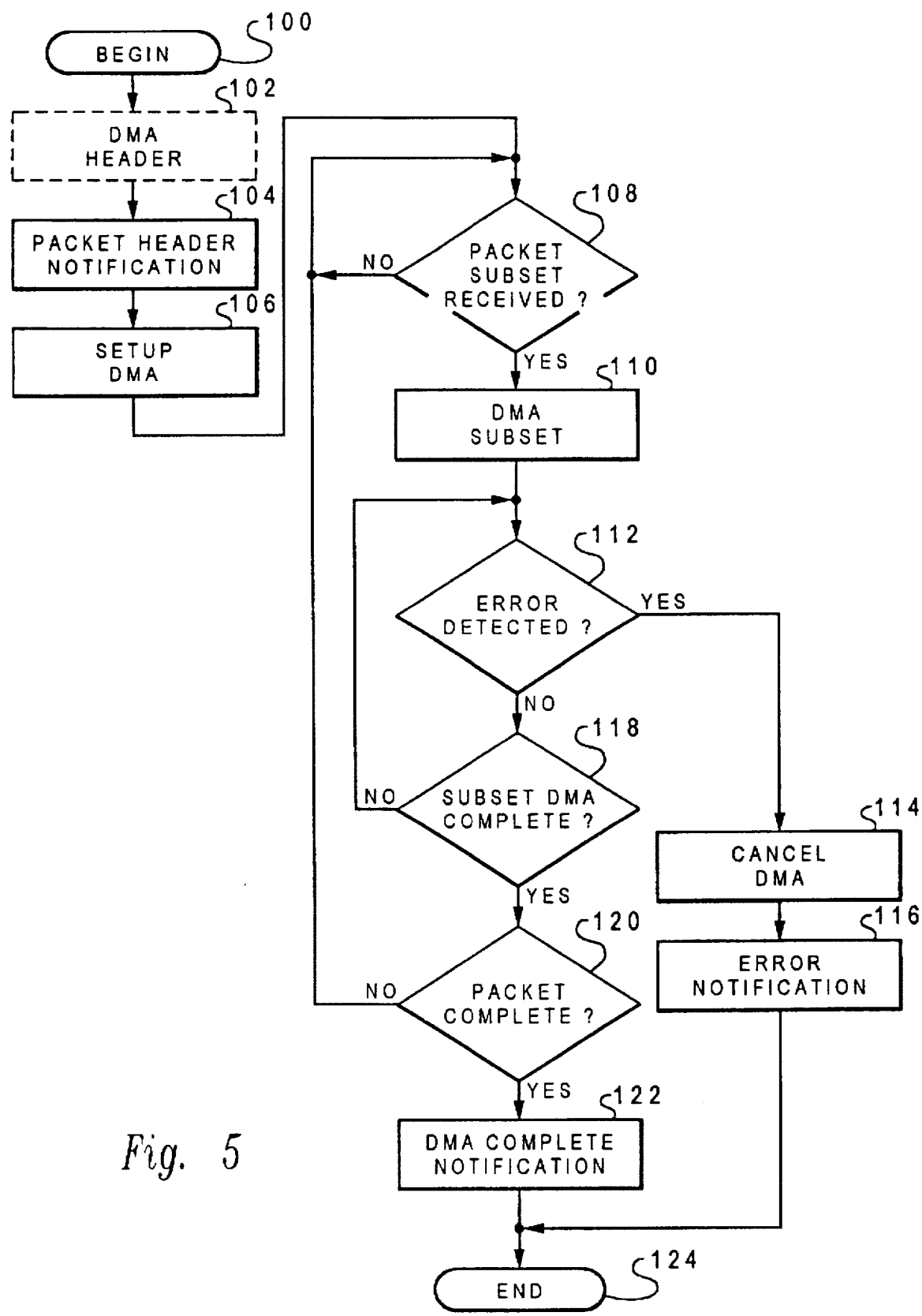
FIG. 5 is a flowchart illustrating a method for receiving a data packet from a communications network according to a second preferred embodiment of this present invention.
Figure 6:
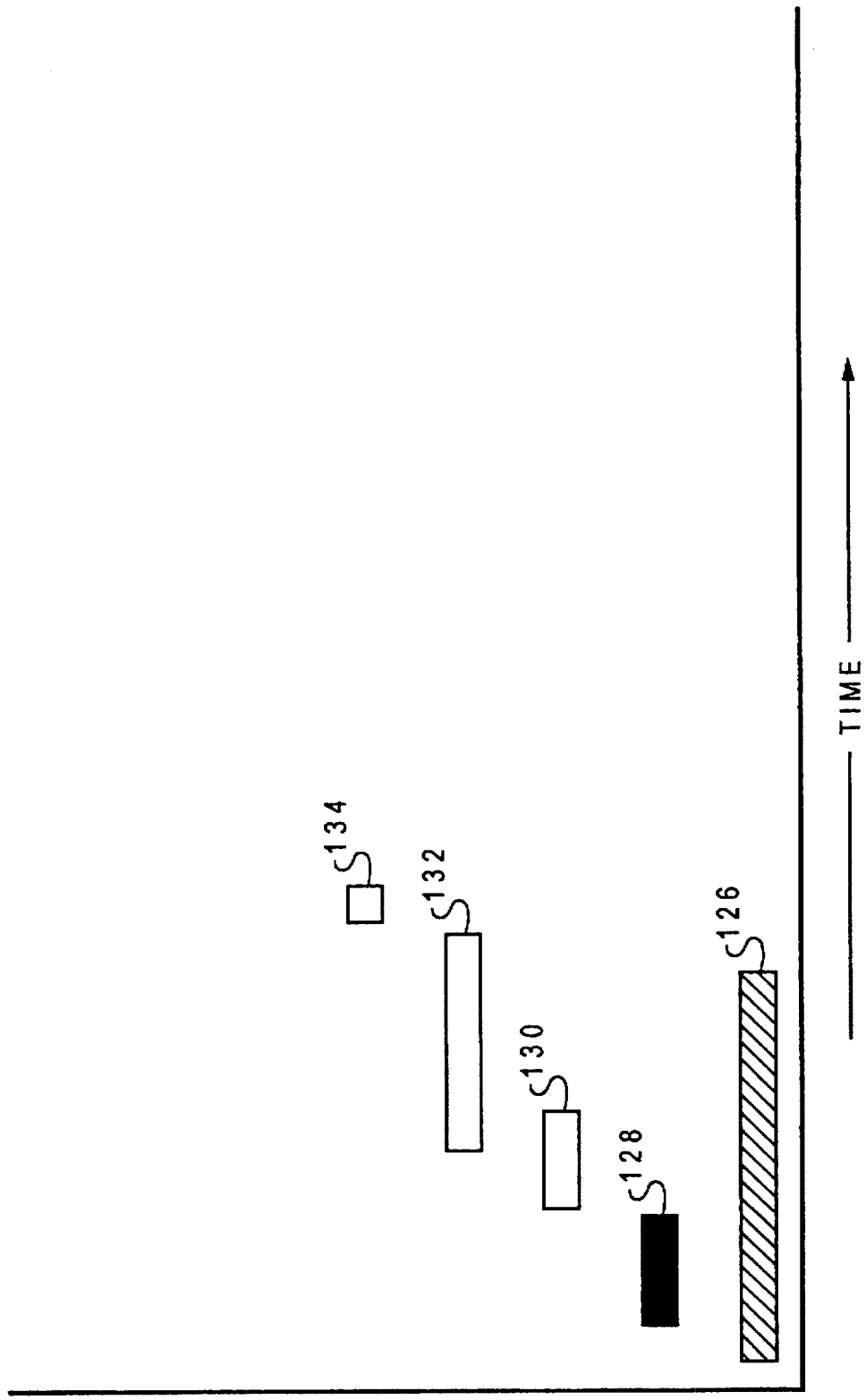
FIG. 6 depicts a timeline of events within the reception of a data packet according to the method illustrated in FIG. 5.

Referring now to FIG. 5, there is illustrated a flowchart of the method of receiving information from a communications network according to a second preferred embodiment of the present invention. As will become apparent from the following description, the process illustrated in FIG. 5 is much like the process illustrated in FIG. 3 except that the method depicted in FIG. 5 transfers a packet of information to user address space as the packet is received rather that waiting for the arrival of the complete packet. As the process begins at block 100, I/O adapter 42 is awaiting asynchronous data from communications link 24. As a packet is received from communications link 24, as depicted in FIG. 6 by bar 126, the process proceeds from block 100 to block 102, which illustrates I/O adapter 42 transmitting the packet header from adapter memory 44 to host address space as soon as I/O adapter 42 receives enough data to ensure that the packet header is contained within the received data. As in the first preferred embodiment, block 102 is only necessary if the communications software executing on CPUs 30 cannot access adapter memory 44 directly. The process then proceeds to block 104, which depicts notifying the communications software that the packet header has been received. Next, the communications software interrogates the packet header at block 106 to set up a DMA transfer of the packet to user address space. According to the depicted embodiment of the present invention, the communication software sets up the DMA transfer such that each predetermined subset of the packet is transferred to user address space as it is received by I/O adapter 42. As will be apparent to those skilled in the art, the amount of data within a packet subset can be set by the communications software on a per connection basis. Setting up the DMA transfer is illustrated graphically in FIG. 6 by bar 130.

Thereafter, the process proceeds to block 108, which illustrates making a determination of whether I/O adapter 42 has received a packet subset. If not, the process returns to block 108 until a packet subset is received. The process then proceeds to block 110, which depicts I/O adapter 42 transferring the packet subset to user address space. If during the DMA transfer an error is detected at block 112, the process proceeds to blocks 114 and 116, which depict cancelling the DMA transfer and notifying the communications software that an error has been detected. Thereafter, the process terminates at block 124.

Returning to block 112, if an error is not detected during the DMA transfer of the packet subset, the process proceeds to block 118, which illustrates making a determination of whether the DMA transfer of the packet subset is complete. If not, the process returns to block 112. However, if the DMA transfer of the packet subset is complete, the process proceeds from block 118 to block 120, which illustrates making a determination of whether the entire packet has been transferred from adapter memory 44 to user address space. If the DMA transfer of the packet is not complete, the process returns to block 108. However, if the DMA transfer of the packet is complete, the process then proceeds to block 122. Referring again to FIG. 6, the DMA transfer of the packet from adapter memory 44 to user address space is graphically represented by bar 132. Returning to block 122 of FIG. 5, I/O adapter 42 notifies the communications software that the DMA transfer of the packet from adapter memory 44 to user address space is complete. The notification of DMA completion is depicted in FIG. 6 by bar 134. Thereafter, the process terminates at block 124.

Figure 8:
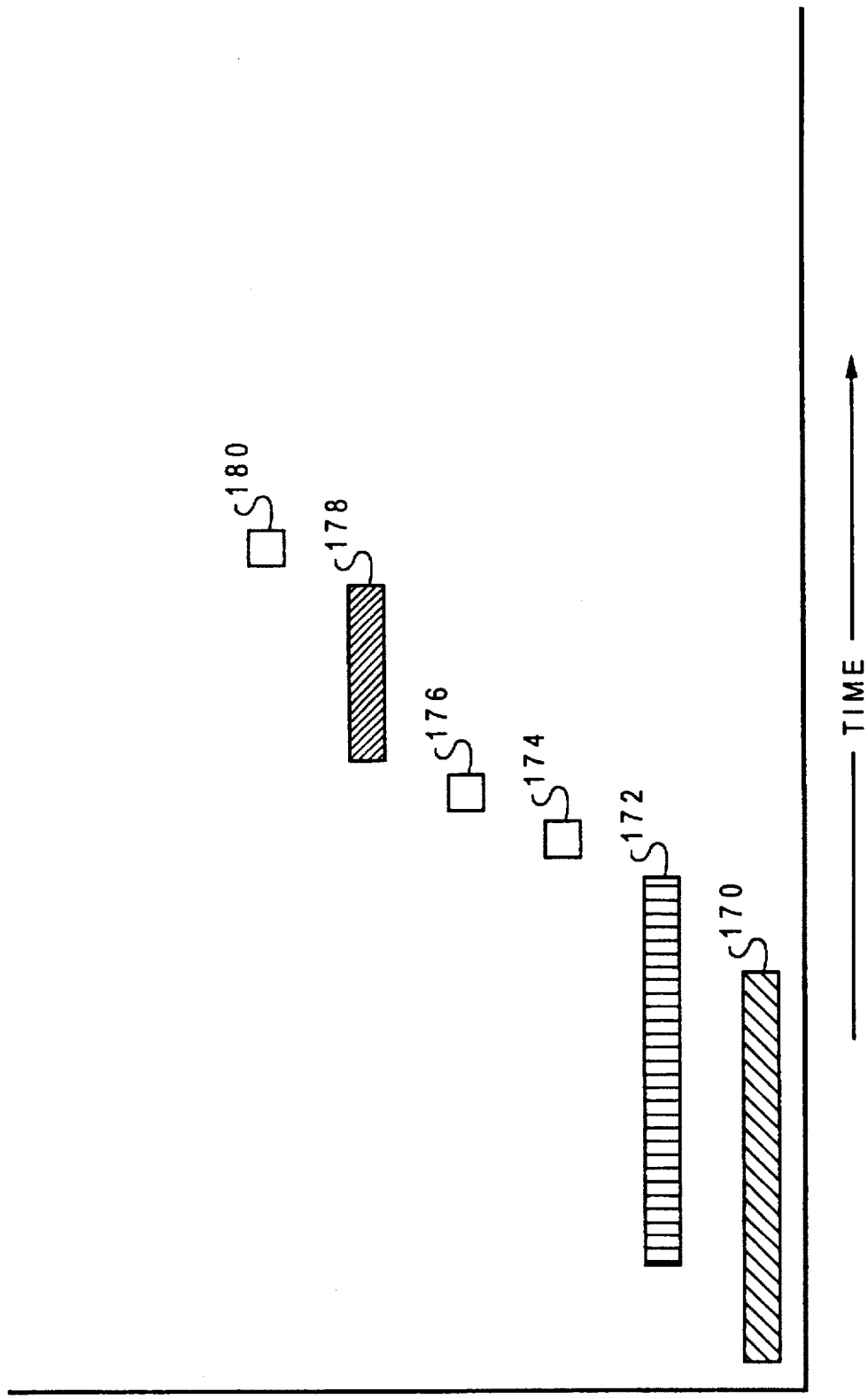
FIG. 8 is a timeline depicting events within the reception of a data packet by a conventional host-based I/O adapter within a data processing system.

As will be appreciated upon examination of FIG. 6 in comparison with FIGS. 7 and 8, the second preferred embodiment of the present invention provides enhanced efficiency over both the conventional host-based and packet-based architectures since the set up of the DMA transfer and the DMA transfer are chronologically overlapped with the reception of the packet by I/O adapter 42. In addition, the disadvantages of the host-based architecture have been addressed since inline DMA services, such as error detection, are available and the additional copying operation from host address space to user address space has been eliminated. Although the second preferred embodiment of the present invention provides a greater reduction in data reception latency than the first preferred embodiment, those skilled in the art will appreciate that the implementation of either embodiment is a design decision that balances the improvement in performance afforded by the second preferred embodiment against the additional complexity it entails.

As has been described, the present invention provides an improved method and system for receiving data from a communications network. The present invention reduces the latency perceived by a user since packet headers are processed and DMA transfers are set up prior to the receipt of a complete packet. While the invention has been particularly shown and described with reference to a preferred embodiment, it will be understood by those skilled in the art that various changes in form and detail may be made therein without departing from the spirit and scope of the invention.

What is claimed is:

1. A method within a data processing system for receiving information from a communications network, said data processing system having a communications adapter coupled to said communications network and a host memory, said communications adapter having an adapter memory, wherein said communications network transmits information to said data processing system in packets including a packet header and packet data, said method comprising:

receiving a portion of a packet of information from said communications network at said adapter memory within said communications adapter, said portion of said packet of information including at least a packet header, wherein said packet header specifies a length of said packet of information and a destination address within said host memory;

in response to receipt of said portion of said packet of information, preparing a transfer of said packet of information from said adapter memory to said host memory prior to receipt of a final portion of said packet of information at said adapter memory;

transferring said packet of information from said adapter memory to said host memory, wherein said packet of information is stored in addresses within said host memory beginning with said destination address;

concurrently with said step of transferring said packet of information, detecting whether or not said packet of information includes an error;

in response to a detection of an error within said packet of information, cancelling said transfer of said packet of information from said adapter memory to said host memory; and in response to a failure to detect an error within said packet of information prior to completion of said transfer of said packet from said adapter memory to said host memory, providing a notification that said packet of information has been received from said communications network.

2. The method for receiving information from a communications network of claim 1, wherein said step of transferring said packet of information to said host memory comprises:

in response to receipt of each predetermined subset of said packet of information, transferring said each predetermined subset of said packet of information to said host memory.

3. The method for receiving information from a communications network of claim 1, wherein said step of transferring said packet of information to said host memory is performed in response to receipt by said adapter memory of said final portion of said packet of information.

4. The method for receiving information from a communications network of claim 3, and further comprising:

in response to receipt of said portion of said packet of information including said header, transferring said header from said adapter memory to said host memory prior to receipt of said final portion of said packet of information.

5. An apparatus within a data processing system for receiving information from a communications network, said data processing system having a host memory, wherein said communications network transmits information to said data processing system in packets including a packet header and packet data, said apparatus comprising:

a communications adapter coupled to said communications network, said communications adapter having an adapter memory;

means for receiving a portion of a packet of information from said communications network at said adapter memory within said communications adapter, said portion of said packet of information including at least a packet header, wherein said packet header specifies a length of said packet of information and a destination address within said host memory;

means, responsive to receipt of said portion of said packet of information, for preparing a transfer of said packet of information from said adapter memory to said host memory prior to receipt of a final portion of said packet of information at said adapter memory;

means for transferring said packet of information from said adapter memory to said host memory, wherein said packet of information is stored in addresses within said host memory beginning with said destination address;

means for detecting whether or not said packet of information includes an error, wherein said means for detecting detects errors during said transfer of said packet of information from said adapter memory to said host memory;

means for cancelling said transfer of said packet of information from said adapter memory to said host memory in response to a detection of an error within said packet of information; and means for providing a notification that said packet of information has been received from said communications network in response to a failure to detect an error within said packet of information prior to completion of said transfer of said packet from said adapter memory to said host memory.

6. The apparatus for receiving information from a communications network of claim 5, wherein said means for transferring said packet of information to said host memory comprises:

means, responsive to receipt of each predetermined subset of said packet of information, for transferring said each predetermined subset of said packet of information to said host memory.

7. The apparatus for receiving information from a communications network of claim 5, wherein said means for transferring said packet of information to said host memory transfers said packet of information from said adapter memory to said host memory in response to receipt by said adapter memory of said final portion of said packet of information.

8. The apparatus for receiving information from a communications network of claim 7, and further comprising:

means, responsive to receipt of said portion of said packet of information including said header, for transferring said header from said adapter memory to said host memory prior to receipt of said final portion of said packet of information.

* * * * *